(12) United States Patent
Levendusky et al.

(10) Patent No.: US 6,758,903 B2
(45) Date of Patent: Jul. 6, 2004

(54) APPARATUS FOR COATING METAL STRIP

(75) Inventors: Thomas L. Levendusky, Greensburg, PA (US); Robert B. Larsen, Maryville, TN (US); Vincent J. Downard, New Kensington, PA (US); Roy B. Steidley, Oakmont, PA (US); Dawn A. Armfield, Knoxville, TN (US); Paul H. Fournier, Knoxville, TN (US); John B. Kapustay, Jr., Maryville, TN (US); Jeffrey B. Pezick, Louisville, TN (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/617,199

(22) Filed: Jul. 9, 2003

(65) Prior Publication Data

US 2004/0007175 A1 Jan. 15, 2004

Related U.S. Application Data

(63) Continuation of application No. 10/025,641, filed on Dec. 19, 2001, now abandoned, which is a continuation of application No. 09/286,540, filed on Dec. 3, 2001, now abandoned, which is a continuation of application No. 08/851,337, filed on May 5, 1997, now Pat. No. 5,919,517, which is a continuation of application No. 08/408,425, filed on Aug. 22, 1995, now abandoned, which is a continuation-in-part of application No. 08/057,743, filed on May 5, 1993, now Pat. No. 5,407,702.

(51) Int. Cl.⁷ ................................................ B05C 1/08
(52) U.S. Cl. ........................... 118/67; 118/68; 118/69; 118/227; 118/249; 118/261; 118/304; 156/224.23; 156/244.24
(58) Field of Search .................................. 118/641, 642, 118/643, 58, 67, 68, 69, 227, 249, 261, 304, 419; 156/244.23, 244.24

(56) References Cited

U.S. PATENT DOCUMENTS

| | | | |
|---|---|---|---|
| 2,175,125 A | 10/1939 | Mack et al. ................... | 91/68 |
| 2,967,786 A | 1/1961 | Wilson ........................ | 117/49 |
| 3,294,613 A | 12/1966 | Eichler ........................ | 156/242 |
| 3,547,682 A | 12/1970 | Erb .............................. | 117/75 |
| 3,575,762 A | 4/1971 | Goehring et al. ........... | 156/244 |
| 4,064,302 A | 12/1977 | Kozlowski et al. ......... | 428/152 |
| 4,790,257 A * | 12/1988 | Schermutzki ............... | 118/227 |
| 5,407,702 A | 4/1995 | Smith et al. ................ | 427/211 |
| 5,772,819 A * | 6/1998 | Olvey ......................... | 156/82 |

FOREIGN PATENT DOCUMENTS

| | | |
|---|---|---|
| AU | 419658 | 10/1960 |
| BE | 622883 | 9/1962 |
| CH | 584 382 | 1/1977 |
| DE | 1 504 109 | 2/1969 |
| DE | 1 446 737 | 10/1969 |
| DE | 1 621 848 | 6/1971 |
| EP | 0 011 883 | 6/1980 |
| EP | 0 067 060 | 12/1982 |
| EP | 0 312 302 | 4/1989 |
| EP | 0 312 304 | 4/1989 |
| EP | 0 312 309 | 4/1989 |
| EP | 0 820 353 | 1/1998 |
| GB | 819105 | 8/1959 |
| GB | 852619 | 10/1960 |
| GB | 2 027 391 | 2/1980 |
| JP | 5-42650 | 2/1993 |
| JP | 06-079801 | 3/1994 |

OTHER PUBLICATIONS

Quantum, A Guide to Polyolefin Extrusion Coating, Quantum Chemical Corporation, Cincinnati, Ohio, Copyright 1992, Cincinnati, OH, pp. 56–57.

(List continued on next page.)

*Primary Examiner*—Laura Edwards
(74) *Attorney, Agent, or Firm*—David W. Brownlee; Christian E. Schuster

(57) ABSTRACT

A method and apparatus for extrusion coating both sides of a metal strip. A metal strip, such as aluminum alloy strip, is moved through a pre-conditioner, two extrusion dies, a post-heater and a cooling system. Both sides of the strip are coated with thin coatings of thermoplastic polymers. The coated metal strip is useful for containers, such as cans and can ends, as well as for automobiles, appliances, aerospace, construction and electrical devices.

51 Claims, 8 Drawing Sheets

OTHER PUBLICATIONS

Menges, Georg, Materials Technology, Synthetic Materials (Plastics). Third Completely Revised and Expanded Edition, Dec. 1989, Aachen, Germany (translation).

Bigg, Donald, "Producing Thermoplastic Matrix Sheet Composites: Two Processes", Plastics Engineering, Oct. '90, Columbus, OH, pp. 33, 34, 45.

Michaeli, W., "Plastics Processing II, Extruder Technology", Institute for Plastics Processing at the RWTH Aachen, Germany.

Bongaerts, H., "Flat Film Extrusion Using Chill–Roll Casting", Plastics Extrusion Technology, Hanser Publishers, Munich Vienna New York, 1988, pp. 143–341.

Bulletin of Patent Public Disclosure, Kokai Tokkyo Koho, Patent Application Public Disclosure Number (Tokkyo Shutsugan Kokai Bangho) Tokkai Sho 60–250936:1985–250936, Dec. 11, 1985.

* cited by examiner

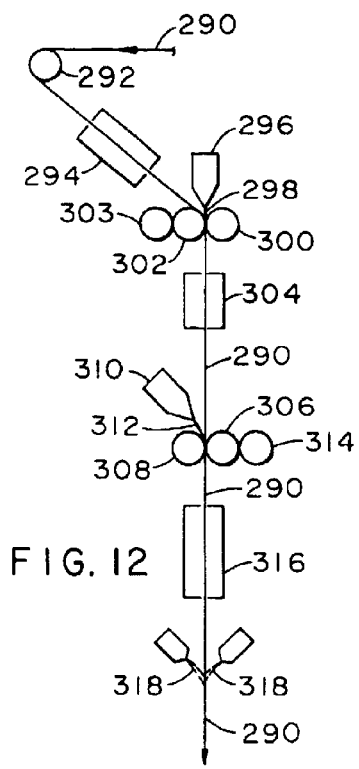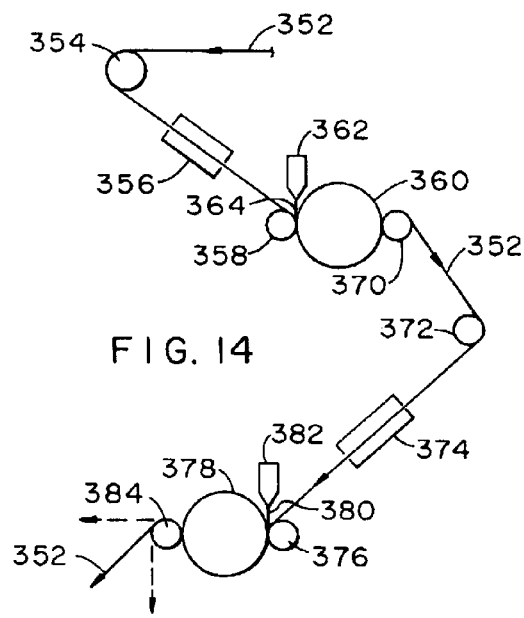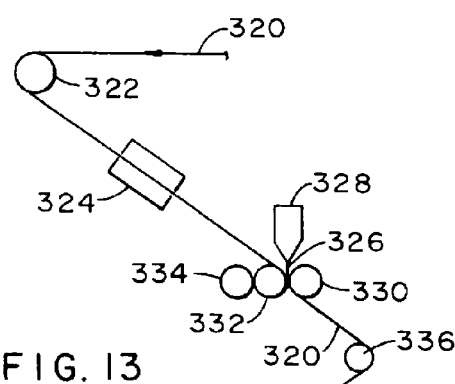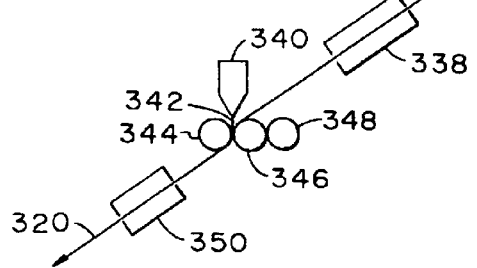
FIG. 12
FIG. 14
FIG. 13

APPARATUS FOR COATING METAL STRIP

This application is a continuation of U.S. Ser. No. 10/025,641, filed Dec. 19, 2001, now abandoned which was a continuation of U.S. Ser. No. 09/286,540, filed Dec. 3, 2001 (abandoned), which was a continuation of U.S. Ser. No. 08/851,337, filed May 5, 1997, now U.S. Pat. No. 5,919,517, which was a file wrapper continuation of U.S. Ser. No. 08/408,425, filed Aug. 22, 1995 (abandoned), which was a continuation in part of U.S. Ser. No. 08/057,743, filed May 5, 1993 now U.S. Pat. No. 5,407,702.

FIELD OF THE INVENTION

This invention relates to a method and apparatus for applying a polymer coating on a strip of metal and, in particular, to a method of coating both sides of an aluminum strip with thermoplastic resins from extruders and extrusion dies which are positioned to deposit the thermoplastic resin on opposite sides of the strip. The product of this invention is a strip of metal, such as aluminum, which has thin polymer coatings on both sides thereof and which has many applications, but is particularly well suited for use in packaging applications such as can ends and can bodies.

BACKGROUND OF THE INVENTION

It is known to coat metal sheet or strip with thermoplastic resin on one or both sides to improve the corrosion resistance, formability, appearance or other properties of the material. The coating can be applied by a variety of processes such as roll coating, reverse roll coating, spraying, electrocoating, powder coating, and lamination. The coated strop may be used for applications such as in cans and can ends, foil pouches, lidding stock, appliances, electrical devices, construction, aerospace or automotive body sheet.

U.S. Pat. No. 5,093,208 to Heyes et al discloses a method for forming a laminated metal sheet in which a precast thermoplastic polyester film is pressed against one or both surfaces of a metal sheet to adhere the film to the sheet in a non-crystalline form. The uncoated sheet of metal is heated to a temperature above the melting point of the polyester film and the film is applied to the sheet under pressure to form a laminate material. The laminate material is then heated to above the melting point of the film to improve the bond of the plastic film to the metal and is quenched rapidly to a temperature below the glass transition point of the polyester to form a non-crystalline polyester. The quenching is done by passing the laminate through a curtain of water.

European Patent Application 0,067,060 in the name of Taiyo Steel Ltd. discloses a method of producing a coated metal plate by directly extruding a thermoplastic resin onto the heated surface of the plate. According to that patent application, molten resin is applied directly from the extrusion die to the metal plate without forming the resin into an independent film. The thickness of the film can be less than 50 microns and preferably down to 35 to 5 microns. The patent application states that since the step of forming an independent film is omitted, the cost of producing the coated metal is reduced. Suitable thermoplastic resins used for coating of metal surfaces include polyolefins, acrylic resins, polyesters, polyamides, polyvinylchlorides and many other resins as listed in the published patent application. The resin can be coated either as a monolayer or multilayers of the same or different resins. The patent application discloses applying the resin on only one side of the metal strip.

An improved process is desired for applying a thin polymer coating on both sides of a metal strip suitable for use in applications such as packaging. A process is desired for producing tight adhesion or welding of the polymer to the strip so that the polymer will not delaminate during subsequent forming of the strip or use of the products produced from the strip.

SUMMARY OF THE INVENTION

This invention provides a method for coating both sides of a metal strip with thin thermoplastic polymer resin to form a coated strip suitable for use in packaging and other applications.

Accordingly, an object of this invention is to provide an improved method of adhering polyester resin on both sides of a metal strip.

The above and other objects and advantages of this invention will be more fully understood and appreciated with reference to the following description and the drawings attached hereto.

BRIEF DESCRIPTION OF THE DRAWINGS

FIGS. 6 through 14 are schematic, side elevational views of further embodiments of this invention.

DESCRIPTION OF THE INVENTION

Figure 1:
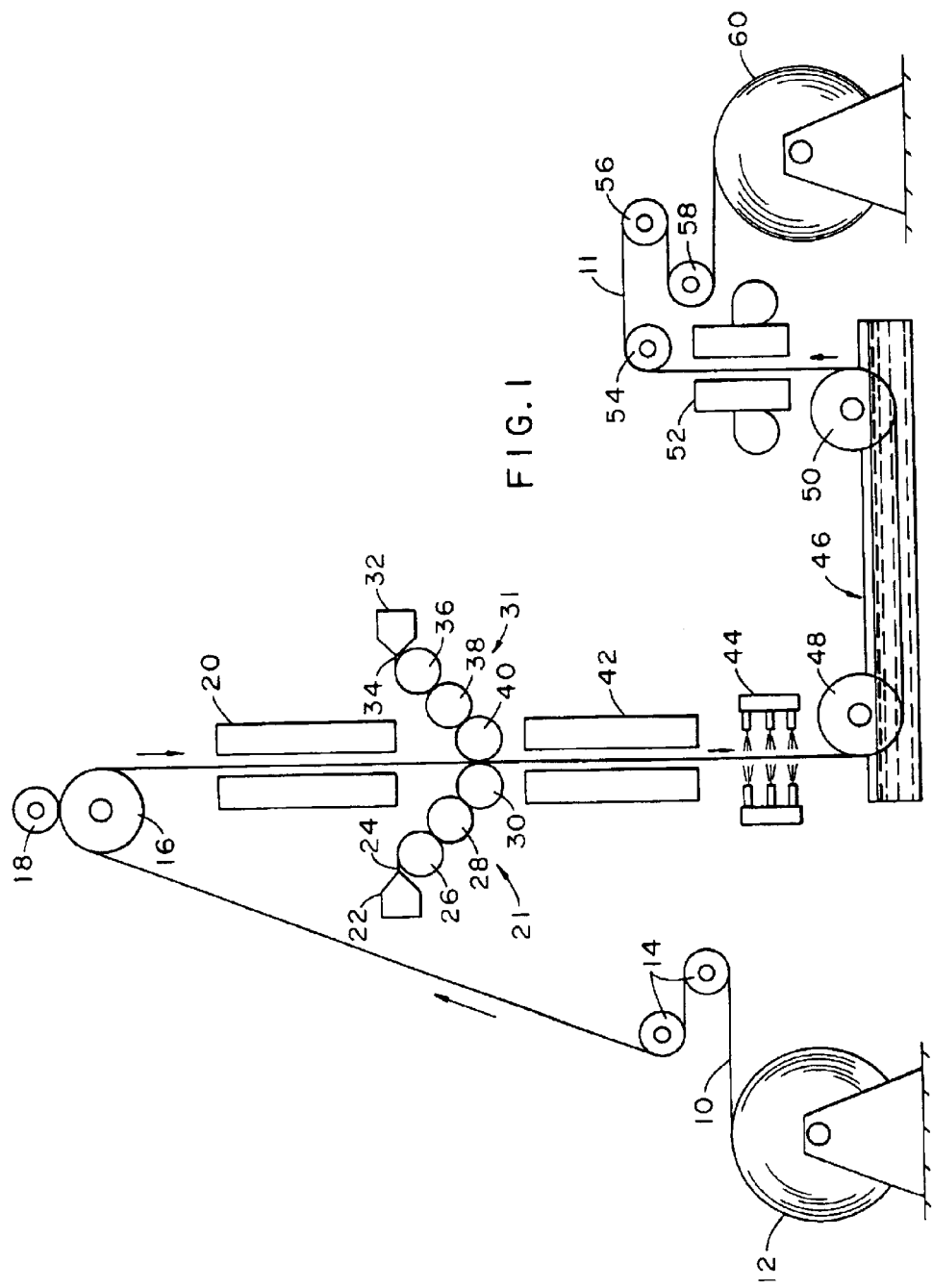
FIG. 1 is a schematic, side elevational view of one embodiment of a system of this invention.

The drawings appended hereto illustrate systems for coating both sides of a strip of metal as it travels from a first coil to a second coil on which the metal is wound after it has been coated. Referring in particular to FIG. 1, a strip 10 of aluminum alloy is unwound from coil 12, moves around tension rollers 14, travels vertically upward over a roll 16 and then downward from roll 16 through the coating apparatus. A back-up roll 18 may be used to maintain the metal strip 10 in a flat condition as it moves over support roll 16.

As the strip 10 moves downwardly from roll 16, it is first heated by heater 20 to a temperature close to or above the melting point of the polymer to be applied thereto. In the embodiment illustrated in FIG. 1, the heater is an induction heater, but other heaters or preconditioners such as flame treatment, infrared, plasma and/or corona discharge may also be employed either singularly or in combination. Flame heaters can be used in tandem (one on each side) or on one side only to enhance performance (improved bonding as well as heating). The coil 12 may also be used, which is still hot from the prior processing, such as rolling or heat treatment, to minimize or even eliminate the need for heating by heater 20. A typical temperature to which the metal is heated, prior to application of the thermoplastic material, in the range of about 121.degree.–260° C. (250.degree.–500° F.) depending on a number of factors, primarily the particular polymer that is to be applied to the strip.

Two separate extrusion coating systems 21 and 31 are provided for applying thin webs of thermoplastic polymer such as polyester resin to the two surfaces of the heated web. The systems 21, 31 are disposed just below the induction heater 20. The extrusion coating systems 21, 31 each include an extruder for delivering a molten polymer extrudate through a sheet die 22, 32 having a narrow exit slit to produce a thin web of extrudate 24, 34 which is passed through a three-roll stack. Alternatively, one extruder may feed both extrusion dies via transfer pipes or other manifolding.

The first rolls 26, 36 of the systems 21, 31 are pinning and drawing rolls which are maintained at a temperature which will promote sticking or clinging of the polymer extrudate to the polished surface of the roll. A typical temperature for this purpose is in the range of about 120° to 180° C. (248.degree.–356° F.), depending on the resin being used. The surface speed of the rolls 26, 36 is substantially faster than the speed of the extrudate exiting the die 22, 32, thus drawing the polymer to a reduced thickness. Typical speed ratios of drawing velocity to extrudate velocities range from about 5:1 to 40:1. The resin from the extruder is typically approximately 0.127–0.635 mm (0.005–0.025 inch) thick and is drawn to a reduced thickness of approximately 0.0076–0.038 mm (0.0003–0.0015 inch) thick.

The second rolls 28, 38 are cooler than the first rolls and are designed to polish and cool the extrudate by rolling contact between the rolls and the extrudate. The second rolls 28, 38 also transfer the extrudate to the third rolls which are the applicator rolls. The third rolls 30, 40 may be tension loaded using springs, hydraulics, pneumatics, or the like and preferably have resilient (such as high temperature resistance elastomers) exterior surfaces, or roll shells, to press the semi-cooled extrudates against the heated metal web or strip 10. The third rolls 30, 40 of the two extrusion sets support opposite sides of the strip 10 against the pressure or force of each other so that the semi-cooled extrudates 24, 34 can be pressed against the strip under the pressure of such third rolls 30, 40.

The coated strip of metal 11 continues its vertical downward travel past or through a second heater 42 which uniformly heats the metal or the plastic, or both the metal and the plastic, especially at the interface therebetween to a temperature that will consummate bonding of the polymer to the metal strip without substantially reducing or otherwise deleteriously affecting the desired properties of the metal strip or the plastic coating thereon. The desired temperature will depend on the particular polymeric material which is being applied as a coating but is somewhere in the range of approximately 200° to 260° C. (392–500° F.). The second heater 42 is preferably an induction type heater, which is well known in the art. Alternatively, the heater 42 could be a convection oven or an infrared heater.

Upon exit from the second heater 42, and while continuing in a vertical downwardly direction, the coated strip 11 is rapidly cooled as by a water spray 44, a water curtain, or other suitable cooling means. Such cooling must lower the temperature of the composite structure to a low enough temperature to allow turning the coated strip around rollers without deleteriously affecting the coating or the metal. In a preferred method of coating an aluminum alloy, such as alloy 3004, can sheet with polyester resin, the composite structure is preferably cooled to below approximately 40° C. (104° F.) before it contacts roller 48. In such a preferred embodiment, cooling is fast enough that the polyester coating on it is solidified in a substantially non-crystalline form. The speed of cooling to accomplish this will depend on the polyester. The rate of cooling can be controlled by controlling the temperature and volume rate of flow of the cooling water against the coated strip.

In the embodiment illustrated in FIG. 1, the coated strip moves through a bath 46, such as water bath, and around rollers 48 and 50 on opposite ends of the bath before the coating is dried. The water bath completes the cooling process.

From the water bath 46, the coated strip 11 preferably moves vertically upwardly through a drying system 52 to remove residual moisture from the strip before rewinding. The drying system 52 may typically comprise warm air blowers. The composite strip next moves over rollers 54, 56 and 58 and onto a rewinder 60. The system may include accumulators, not shown, to accommodate roll changes or coil changes and may also include means for leveling the metal after it has been coated. The system also preferably includes trimmers, not shown, for trimming the edges of the coated metal web 11 or to remove any polymer that extends past the edges of the metal. The trimmers may be located at various points along the path of the strip such as immediately after the polymer resin is applied to the strip, after the spray cooler, or after the drying system.

The aluminum strip that is coated by this invention may be of a variety of alloys and tempers depending on the use which is to be made of the strip. Some typical aluminum alloys suitable to be forming can ends and can bodies include Aluminum Association alloys 5042, 5182 and 3004 in intermediate to hard temprs including H-14, H-19 and H-39 tempers, among others. The metal strip is typically 0.1778–0.356 mm (0.007 to 0.014 inch) thick.

In accordance with this invention, a variety of thermoplastic polymers such as a polyester can be used to coat an aluminum strip which is designed for use in packaging such as cans or can ends. A preferred polyester resin is a high melt viscosity (HMV) resin of the type that has heretofore been used to coat ovenable metal trays, liquid foil packaging and heat sealable foil packaging. SELAR.RTM., PT8307 HMV copolymer resin sold by E. I Du Pont de Nemours Company is an example of a high performance polyester resin suitable for use in this invention. Such copolymer can also be blended with other thermoplastic polyesters such as bottle grade polyesters having intrinsic viscosities of about 0.72 IV and above. For example, a blend of SELAR.RTM., PT8307 HMV copolymer with T89 PET sold by Hoescht-Celanese may provide improved performance for aluminum strip coated in accordance with this invention for use in making products such as ends for beverage cans. Other thermoplastic polymers suitable for use in this application include polypropylene, polyethylene, polyamides (nylon), polyimides, polycarbonates and polyvinyl chloride (PVC), among others.

Figure 2:
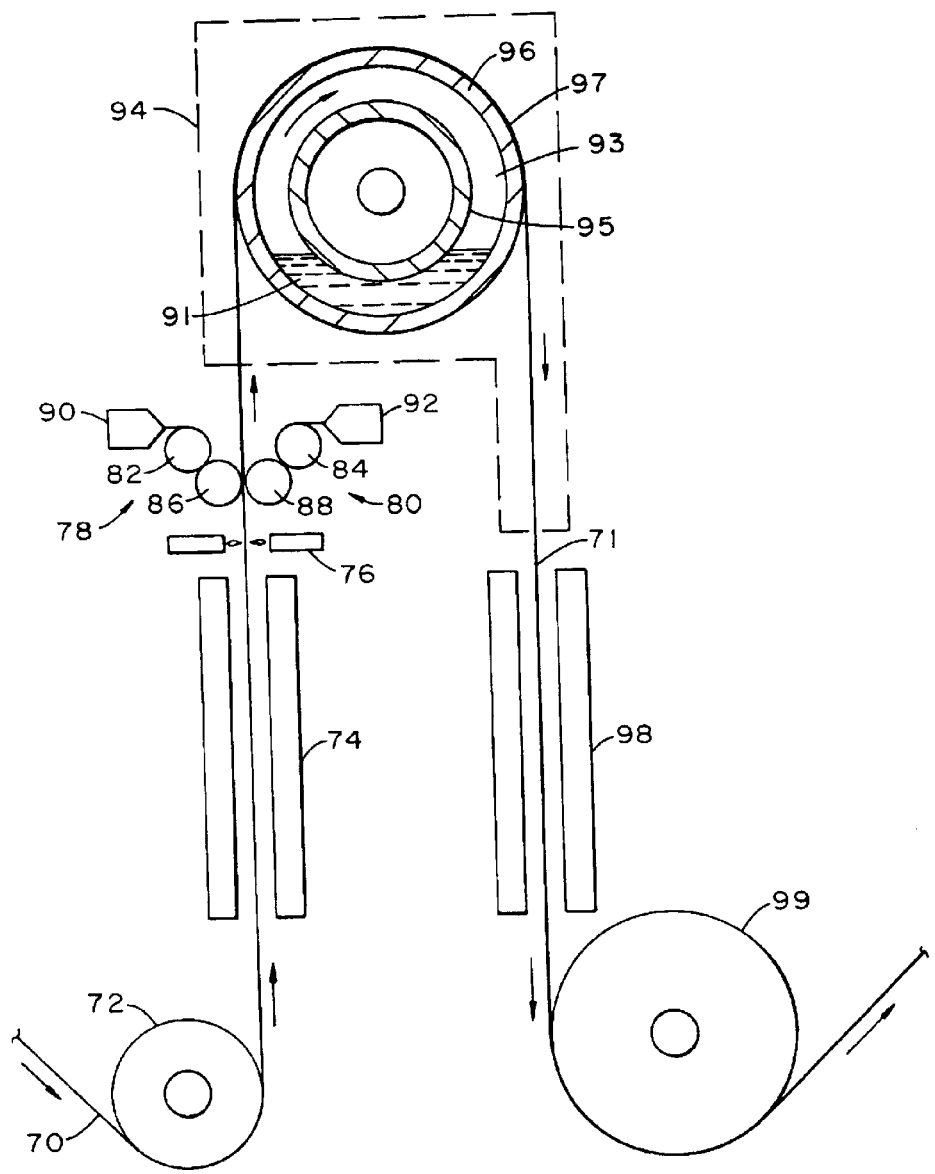
FIG. 2 is a schematic, side elevational view of a portion of another embodiment of this invention.

FIG. 2 shows a portion of an alternative embodiment of a system for practice of the present invention. In this system, the metal strip 70 is coated on both sides as the strip preferably moves vertically upwardly instead of vertically downwardly as in FIG. 1. The metal strip 70 moves around an infeed roll 72 and vertically upwardly from that roll through a pre-heater 74 such as an induction heating system. The strip then moves through an optional flame treater 76 and between the opposed extrusion systems 78, 80 for coating both sides of the strip. The flame treater enhances the receptivity of the strip to bonding by the resin coating.

The extrusion coating systems 78, 80 in FIG. 2 are similar to that of FIG. 1 except that the systems 78, 80 each include only two rolls rather than three rolls as in FIG. 1. The surface speed of the pinning and drawing rolls 82, 84 is several times faster than the exit speed of the polymer from the extruder dies 90, 92 so as to draw and thin the extrudate as in the system of FIG. 1. Rolls 86, 88, which are cooler than rolls 82, 84, receive the extrudate from rolls 82, 84 and apply it to the strip 70.

After the strip 70 has been coated on both sides, the strip continues to move vertically upwardly into an insulated chamber 94 which contains a cooling and a turning roll 96 for cooling the strip and redirecting it vertically downwardly. The chamber 94 is preferably insulated for accurate temperature control of the strip as it moves over the cooling and turning roll 96. The roll 96 preferably has an outside shell diameter of at least approximately three feet. The roll's large diameter minimizes stressing of the metal due to curvature effects. The temperature of roll 96 and strip 71 is controlled by fluid 91 in an annular chamber 93 between the roll's outer shell 97 and an inner shell 95. The annular chamber 93 is preferably not filled to capacity so as to minimize the inertia effects (provides viscous damping) and enable speed control and tracking.

The composite coated strip 71 moves vertically downwardly from the turning and cooling roll 96 through a post-heater 98 which heats the composite strip to approximately 204–260° C. (400–500° F.) to enhance bonding of the polymer such as polyester resin to the strip as in the embodiment of FIG. 1. The heater 98 may be a conventional induction heater, convection oven or infrared heater. The composite strip 71 moves from the heater 98, through cooling or quenching means not shown, to a second cooling and turning roll 99 and from that roll to a rewind roll not shown. Roll 99 is similar in design and dimensions to roll 96 described above.

Figure 3:
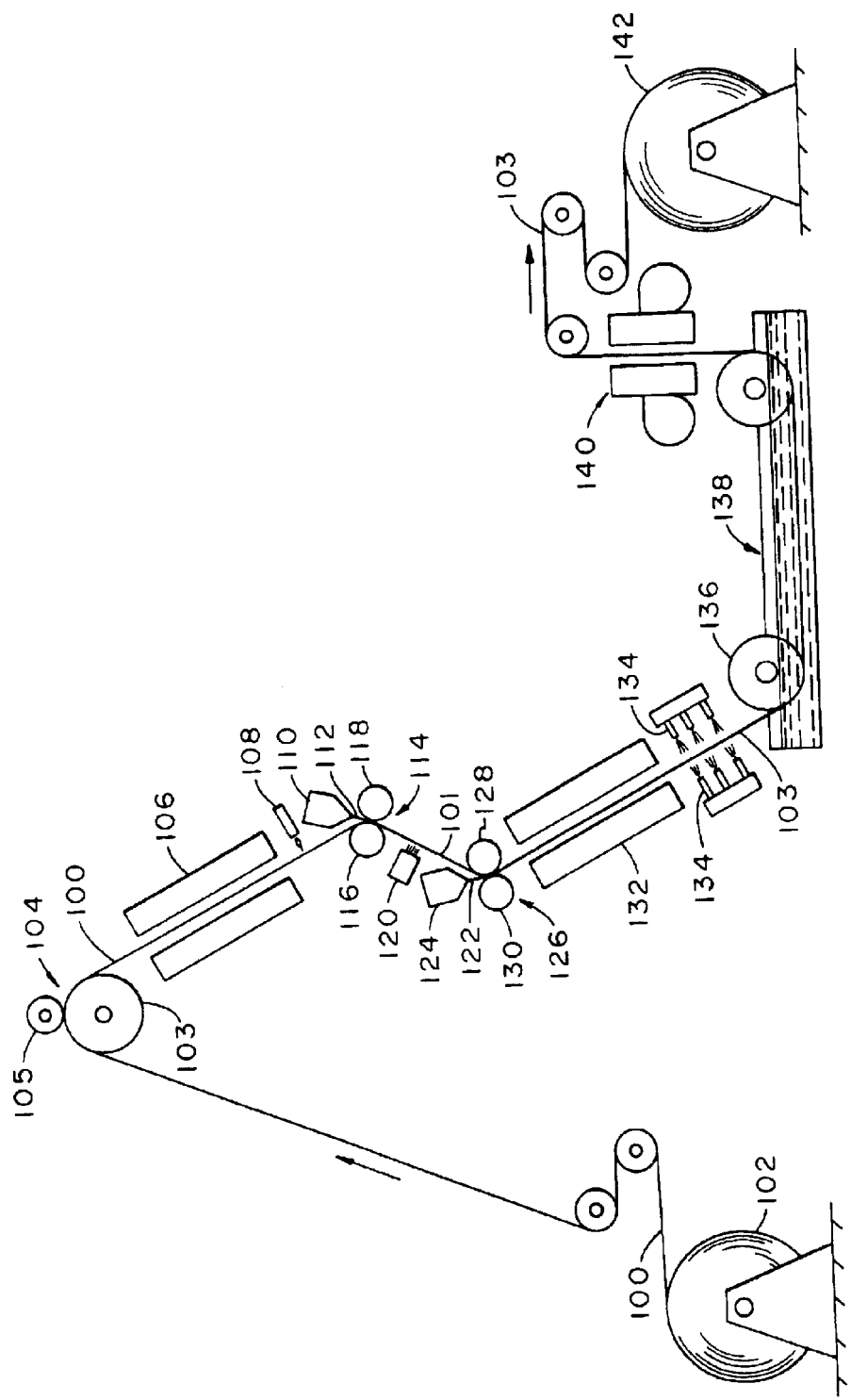
FIGS. 3 and 4 are schematic, side elevational views of further embodiments of this invention.

FIG. 3 is a schematic of another embodiment of this invention in which cleaned, room temperature, conditioned sheet stock 100 is unwound from an unwinder 102 and fed upwardly over a draw roll set 104 consisting of roll 103 and an optional back-up roll 105 at the top of the processing stack. Accumulators, not shown, may be included toFrom the draw roll set 104, the web 100 travels in a vertical and downward direction, and is preferably slanted about 30–45 degrees from the vertical. Such slant facilitates downstream extrusion coating and machinery arrangement. The web 100 passes through a pre-heater 106, wherein an induction field is generated to uniformly heat the metal to a temperature that will enhance downstream "green peel" strength of the bonded polymer to the strip without substantially reducing or otherwise deleteriously affecting the desired metal properties. As used herein, "green peel" strength means that the polymer is adhered to the metal strip with sufficient holding power that the polymer will not delaminate from the strip during subsequent processing. The desired temperature should be in the range of approximately 204–260° C. (400–500° F.), and preferably approximately 215°–246° C. (425.degree.–475° F.) when applying polyester.

The pre-heated web 100 continues in a downwardly slanted direction and passes through an optional flame surface treater 108. The flame treater may reduce the surface of the pre-heated metal to eliminate, minimize or enhance oxides, and thereby enhance adhesion of a polymer which is subsequently applied to it.

The heated and treated web 100 next enters the first of two extrusion coating stations. An extruder, not shown, melt-plasticizes a PET polymer or other thermoplastic resin and delivers it through a sheet die 110 which is positioned either vertically or obliquely from vertical and which has a narrow exit slit. The slit is set to produce a back-pressure to the extruder that enables spreading of an extrudate 112 to a width at least as wide as the width of strip 100. The slit may have a width less than the width of the strip 100 depending on several factors such as the nature and thickness of the polymer resin, the relative speeds of the extruder and metal strip and the shape of the die, the shape of the extrudate film, among other factors. The extrudate 112 is drawn into a roll stack 114 to reduce its thickness to the final thickness for application to the web. The draw thickness ratio should be approximately 10–25:1, depending on the extruded polymer.

The two-roll stack 114 is disposed such that a plane through the centerline of the rolls is slanted approximately 30 degrees from horizontal. The "inside" or turning roll 116 preferably has a resilient surface made of high temperature-resistance elastomer and is internally and/or externally cooled to minimize deterioration of the elastomer.

The outside or pressure roll 118 is chrome-plated steel, polished, and preferably maintained at a temperature below about 150° F. or 66° C. (for polyester) which is below the "stickiness" point of the molten polymer which applies line pressure to the polymer as it is applied to the strip material. This enhances adhesion of the polymer to the metal 100 as well as improves surface appearance. The surface speed of the rolls 116, 118 is approximately 10 times faster than the extrudate's exit speed from the extrusion die 110, thus drawing the polymer onto the web 100 to its desired thickness in a range of approximately 0.00762 mm to 0.02032 mm (0.3–0.8 mils) and preferably about 0.01016 mm (0.4 mils). The two-roll stack 114 coats the first side of the web 100 with adequate "green peel" strength to avoid separation of the polymer from the metal during the subsequent processing.

The single-side coated web 101 next exits the stack 114 and turns approximately 60 degrees (as a result of the preferred positioning of the second extrusion station) over the elastomer coated roll 116 to slant the web downward 30–45 degrees from vertical (approximately 60 degrees from the entry position into the first stack). The preheated and single-side coated web 101 continues in a 30–45 degree slanted and downward direction, may pass through an optional second (and possibly larger) flame or other type of boost heater 120, wherein the surface of the pre-heated metal is treated to eliminate/minimize oxides on the second surface and enhance adhesion of the polymer, as well as to provide any needed temperature "boost" to achieve optimum bonding conditions. The pre-heated and pre-treated web 101 next enters the second of the two extrusion coating stations to coat the opposite side of the web than was coated by the first coating station. The extruder performance requirements, arrangement, and process for the second extruder are identical to the first extruder. The melted extrudate 122 from extrusion die 124 is passed into the nip of a two-roll stack 126 having an arrangement in which a plane through the centerlines of the rolls 128, 130 is inclined approximately 30–45 degrees from the horizontal (45–60 degrees from the centerline position of the first stack 114).

The geometries, arrangement, performance, and functions of the rolls 128, 130 are identical to that of the first stack 114. The second side of the pre-heated web 101 is coated with extrudate 122 to produce adequate "green peel" strength, as described above for the first side. The double-sided coated web 103 next exits the stack 126 and is preferably turned approximately 45–90 degrees over the rubber coated roll to achieve a preferred positioning for the induction bonding heater 132 at approximately 30–45 degrees from vertical in a downward direction.

The now-coated web 103 continues in a slanted and downward direction and passes through a second heater 132, preferably an induction heater, to uniformly heat the metal/plastic interface to a temperature that will consummate a bond of the plastic to the metal web without substantially reducing or otherwise deleteriously affecting the desired metal properties or the plastic. The temperature is preferably approximately 400–550° F. (204–228° C.) and preferably about 425–475° F. (215–246° C.) for polyester.

Upon exit from the induction heater 132, and while continuing in a slanted and downward direction, spray nozzles 134 (or other suitable devices) cool the composite structure to a temperature low enough to allow turning around roller 136 without deleteriously affecting the composite material's ultimate end-use performance requirements. The semi-cooled composite 103 is turned and passed through a horizontal water bath 138 to complete the cooling process.

A drying system 140 is used after the composite 103 leaves the bath 138 to remove residual moisture before rewinding. Leveling is performed to remove stresses produced by the turning or bending of the metal strip 100 over the rolls. The completed material 103 is then rewound by rewinder 142. Accumulators, not shown, can be used to accommodate roll changes and coil changes on the rewinder 142.

Figure 4:
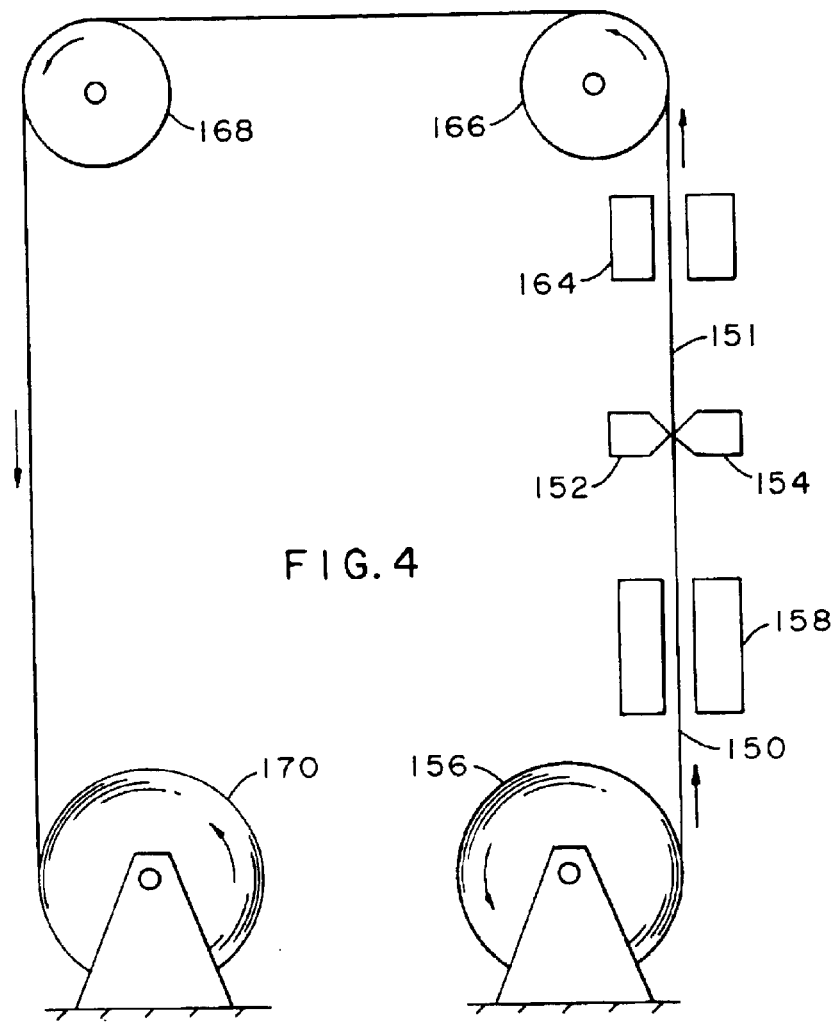
Figure 5:
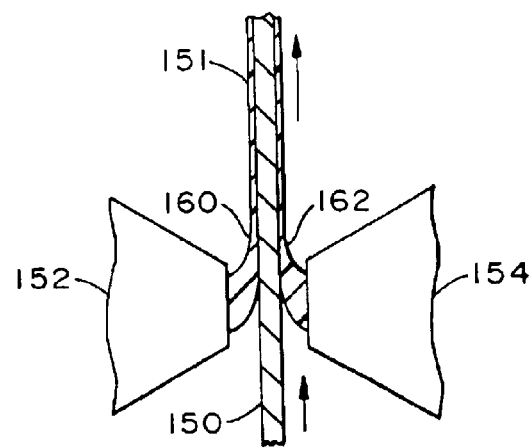
FIG. 5 is a partial cross section of the strip and extrusion dies of FIG. 4 greatly enlarged to show the application of the resin to the strip.

FIGS. 4 and 5 illustrate a further embodiment of this invention in which the metal strip 150 is moved vertically upwardly during the coating process and in which the extrusion dies 152, 154 apply the molten resin directly against the opposite sides of the strip. The system of FIG. 4 includes an unwinder 156 from which strip 150 travels upwardly through an induction pre-heater 158, and then between two extrusion dies 152, 154. The dies 152, 154 are fed by conventional extruders, not shown.

FIG. 5 is a greatly enlarged showing of the dies 152, 154 as they apply extrudate 160, 162 directly to the metal strip 150. The die orifices are positioned close to the strip so that the force of the extrudate issuing from the dies is applied against the strip. The dies are positioned within about 5 to 20 mm of the strip, and preferably less than 10 mm from the strip. The metal strip 150 travels approximately 10–20 times faster than does the extrudate issuing from the dies 152, 154 so the extrudate is drawn and reduced in thickness by pull of the strip on the extrudate. The extrudate may be in the range of 0.0127 to 0.0508 mm (0.0005–0.002 inch) thick on each surface of the strip.

The dies 152, 154 are preferably directly opposed to each other on opposite faces of the strip 150 so the pressure of the extrudate from opposite sides of the strip will center the strip between the dies. The molten polymer impinges upon the surface of the metal strip almost immediately after the extrudate exits the dies, so the polymer does not cool or neck-in before it is applied to the strip. This helps to ensure the application of uniform coatings of the resin on both faces of the strip.

From the extrusion dies 152, 154, the coated strip 151 preferably moves through an induction type post-heater 164 which heats the composite strip to above the melting point of the polyester resin to enhance bonding of the resin to the strip. The composite strip is then quickly cooled by means not shown and travels over rolls 166 and 168 to a recoiler 170.

FIGS. 6 through 14 show alternative embodiments of this invention for coating both faces of strip metal such as aluminum, steel, copper, metal laminates or the like. These embodiments all include means for preheating the metal strip, first and second extrusion coating apparatus including dies and application rolls, means for post-heating the strip after it has been coated on both faces, and means for cooling the strip. The systems may also optionally include means for reheating the strip between the first and second coating apparatus. The systems all include an extruder or extruders for feeding polymer extrudate to the dies. Each of the first and second extrusion coating apparatus in the systems includes a casting roll which contacts the web of polymer extrudate to press it against the metal strip and a back-up roll which supports the strip metal and provides a roll nip for pressing the strip metal and web of polymer together to adhere the polymer to the face of the strip. The systems may optionally include a support roll for one or both back-up rolls to support the back-up roll and help to cool it.

The preheater, reheaters and postheaters in these systems can be of a variety of forms such as induction, flame, infrared, radiant, electric, fossil fuel convection furnaces, heating rolls or any combination of such devices. The strip can also be preheated in coil form or from prior processing of the strip to either supplement or replace a preheat device. A preferred form of heater is a TFe induction heater that is available from Davy McKee (Poole) Ltd. of Poole, England.

The dies in these systems are positioned within approximately 4–12 inches (10.2–30.5 cm), and more preferably about 6–8 inches or 15.2–20.3 cm (depending on the die and roll sizes), of the die nip between each pair or rolls. The extruded webs of polymer preferably contact the metal strip and the casting roll substantially simultaneously at the roll nip or contact the metal strip just ahead of the roll nip. Alternatively, the extruded webs can contact the casting roll a few degrees of rotation before entering the roll nip. Such contact of the casting roll before the roll nip should not be more than a few degrees of rotation of the roll, such as about 0–25. degree., to minimize cooling of the polymer before the polymer contacts the metal strip at the roll nip.

The extruded webs of polymer may be approximately 0.005 to 0.30 (0.127–0.254 mm)inches thick and are preferably drawn downwardly by the metal strip and rolls to reduce the thicknesses of the webs. The draw ratio may be in a range of about 1:1 to 200:1, and more preferably about 10:1 to 40:1. As used herein, draw ratio means the ratio of the thickness of the web as extruded to the thickness of the web as applied to the strip metal. The draw ratio is generally determined by the difference between the rate of extrusion from the dies and the speed of the strip metal being coated. For example, a draw ratio of 20:1 generally means that the strip is moving about 20 times faster than the speed of the web as it exits the die opening. Techniques for drawing and thinning extruded webs of polymer are well known in the art.

For some systems, it may be desirable to provide supplemental means in advance of the roll pairs to pin or apply the extruded webs against the face of the strip metal. Supplemental pinning means can include air knives, electrostatic devices, and vacuum pinning means, among others. The webs may be cast to be entirely on the strip metal or may be cast wider than the metal and later trimmed to remove excess coating.

For most applications, the casting roll is preferably a hard metal roll having a chrome plating, chrome oxide, aluminum oxide or other hard metal roll surface on it. Such roll surfaces may be polished or textured. The casting roll is preferably cooled to below the stickiness or softening point of the polymer so the polymer will not stick to the roll. The back-up roll for most applications preferably has a resilient outer surface portion made of silicone rubber, polyurethane, chlorotrifluorethylene polymers such as VITON.RTM. or KEL-F.RTM., tetrafluroethylene fluorocarbon polymers such as TEFLON.RTM., or other high temperature resistant synthetic rubber or elastomeric material, or combinations of such materials. VITON.RTM., KEL-F.RTM. and TEFLON-.RTM. are trademarks of E. I Du Pont de Nemours Company. The outer surface of such elastomeric material preferably has a Durometer hardness of approximately 75–85 shore A. For some applications, it may be desirable to have a hard surface such as TEFLON.RTM., VITON.RTM. or KEL-F.RTM. elastomers over a more resilient material such as natural or synthetic rubber to provide a hard wear surface and appropriate compressibility. Both the casting roll and back-up roll should have relatively smooth surfaces in a range of about 2–20 root-mean-square (rms). For some applications, the casting roll may alternatively have a hard high temperature resistant synthetic rubber surface as described for the backup roll.

The casting roll and back-up roll are pressed against the strip metal and polymer web as the strip and web travel through the roll nip to thereby adhere the web to the strip. Pressing the rolls toward one another presses the metal strip against the resilient material on the back-up roll and helps to assure that the polymer web is pressed against the metal strip across the full extent of the roll nip with no gaps in the contact. The force across the roll nip may vary slightly due to misalignment of the rolls or small variations in the strip thickness, and roll finishes among other things, but must not have gaps of inadequate roll force. Pressing the rolls together compresses the elastomeric material on the backup and/or casting rolls to produce a band of contact at the roll nip along the length of the rolls which is believed to accommodate any errors in alignments of the rolls of out-of-flatness of the metal strip and provide more uniform distribution of the force of the polymer web(s) against the metal strip for better coating uniformity and bonding. Apparatus for providing the force for pressing the rolls against one another and regulating or adjusting the force are well known in the art and include pneumatic and hydraulic cylinders, jacks and screws which act on the rolls.

The polymer coatings applied by this invention may be any of a variety of resins as described above with respect to FIG. 1. The resins are preferably essentially 100% polymer with little or no solvents in them that can volatilize. The same or different resins may be applied on the opposite sides of the strip, and one or both coatings may contain a pigment or other additive. The strip metal is preferably an intermediate to hard temper aluminum alloy having a thickness of about 0.007 to 0.014 inch (0.1778–0.3556 mm) as described about with respect to FIG. 1, but can also be other metals such as steel or copper or laminates. The strip is preferably pre-cleaned and may be pre-treated as by anodizing or conversion coating (preferably non-chrome) or surface roughening to improve performance and improve adherence of polymer coatings to the strip. For example, aluminum strip can be cleaned and treated with titanium or zirconium phosphate treatments, silicate treatment or BETZ METCHEN.RTM. conversion coatings. BETZ METCHEN.RTM. is a registered trademark of Betz Laboratories, Inc., of Horsham, Pa. The strip may also be precoated on one or both sides with organic coatings or finishes to enhance bonding of the polymer to the strip.

In the operation of these systems, the metal strip is moved through the system at speeds in a range of about 300–1500 feet per minute (fpm) or about 90–450 meters per minute (mpm) and preferably about 600–1200 fpm (180–360 mpm). Higher speeds obviously increase productivity and also reduce the time period (residence time) during which the metal is at elevated temperatures. Shorter residence times are sometimes preferred to minimize reduction in metal properties.

Figure 6:
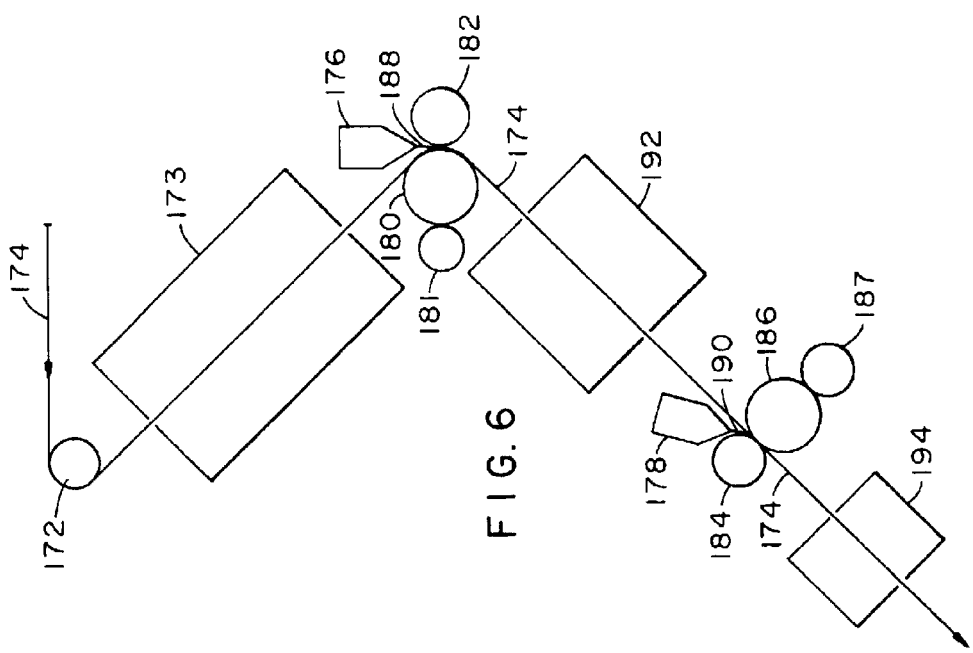

Referring now to FIG. 6, the coating system is illustrated as including a roll 172 over which metal strip 174 travels to be fed into and through a preheat device 173 such as an induction heater which heats the strip to a temperature in a range of about 250–550° F. (121–288° C.) depending on the metal and temper of the strip, the desired properties of the strip after coating, and the polymers to be applied, among other factors. For aluminum strip to be coated by polyester resin for use of the coated strip in packaging applications, a more preferred preheating range is approximately 400 to 550° F. (204–288° C.). The preheat temperature, as well as the reheat and postheat temperatures, must not be so high as to deleteriously affect the desired properties of the strip metal or the polymer coatings on the strip.

The preheated strip 174 is coated sequentially on opposite faces by two extrusion dies 176, 178 and two pairs of rolls 180, 182 and 184, 186. One or two extruders, not shown, feed molten polymer resin to the extrusion dies 176, 178. The resin can have a temperature in a range of about 350 to 650° F. (177–343° C.) as fed to the dies 176, 178, and the dies are preferably heated as by electrical resistance means to maintain the resin at the desired temperature. The extrusion dies 176, 178 have elongated, narrow die openings therein approximately corresponding in length to the width of the strip 174 which is being coated, which may be about 10–85 inches (25.4–215.9 cm) or more. The length of the die opening is preferably at least as wide or wider than the width of the strip 174 so the web of polymer extruded from each die will fully cover the strip. The die openings are long and narrow in order to extrude thin webs. The die openings may be up to 0.030 inch (0.762 mm), and preferably are in a range of approximately 0.005 to 0.015 inches (0.127–0.381 mm). The dies are generally conventional dies and are available from a variety of vendors. The dies 176 and 178 exude thin webs 188 and 190 which are applied against opposite sides of the strip 174 by the roll pairs 180, 182 and 184, 186.

In the first roll pair, roll 182 is the casting roll which contacts the web 188 of polymer issuing from die 176, and roll 180 is a back-up roll which supports the strip 174 against the casting roll. As stated above, the casting roll 182 is preferably a hard metal roll, and the back-up roll 180 preferably has a resilient outer roll surface or shell such as a silicone rubber outer layer on it. Both the rolls 180, 182 are preferably cooled by coolant such as water which is circulated through them. The casting roll is cooled to less than about 150° F. (66° C.) so the web of polymer will not stick to it. The back-up roll 180 is preferably internally and/or externally cooled to minimize heat damage to the resilient layer on the roll. A support roll 181 may be optionally provided to support the back-up roll 180 and help cool it.

As shown, the rolls 180, 182 may be positioned parallel with their axes side-by-side in a substantially horizontal plane so the strip metal 174 and polymer web 188 can be fed downwardly into the nip between the rolls and out through the bottom of the roll nip. The strip 174 may follow the outer surface of the back-up roll around approximately a 0 to 120° arc of the roll before the strip leaves the roll surface to travel to the reheater 192. The polymer web 188 on the strip metal 174 preferably has minimal contact with the casting roll 182 in order to minimize possible sticking or adverse effects on the web by the roll. This minimization of contact is especially applicable for polyester resins, whereas more contact and greater cooling of the resin by the casting roll is desirable for polypropylene resins (See FIG. 14). The rolls 180, 182 are pressed together with a force of about 50–300 pounds per linear inch (pli) or about 9.0–53.7 kg per cm, preferably about 120–180 pli (21.5–32.2 kg per cm), and more preferably about 150 pli (26.9 kg/cm) along the length of the roll nip. This force causes the resilient compressible outer portion of the back-up roll 180 to be deformed or impressed slightly to insure that there are no gaps in the force of the rolls against the metal strip across the full length of the roll nip and provides a measure of forgiving or accommodation to misalignment of the rolls or out-of-flatness of the sheet material. But this force does not reduce the gauge of the polymer or the materials. As stated above, this compression of the compressible layer on the backup roll 180 produces a narrow band of contact between the rolls 180, 182 and the strip 174 at the roll nip. Depending on the amount of force pressing the rolls together and the resiliency of the support roll 180, among other factors, a typical band of contact may be about ¼ to 1 inch (0.64–2.54 cm) wide and typically about ¾ inch (1.9 cm) wide.

After the strip 174 has been coated on one face, it may optionally be reheated as, for example, with an induction heater 192 or the like. The strip may be reheated to a temperature in the range of about 250 to 550° F. (120–288° C.), depending on the polymer being applied, and more preferably to about 400 to 550° F. (204–288° C.) for polyester coatings. For some applications and some polymers, it may not be necessary to reheat the strip 174 before it is coated on its opposite face.

From the reheater 192, the strip 174 travels to the second extrusion die 178 and roll pair 184, 186 and optional cooling roll 187 for a second polymer web 190 to be applied to the opposite side of the strip from that coated by the first web 188. The distance from the exit of the first nip to the second nip is preferably kept short to control the heat loss from the metal as it travels between the two roll nips. The second die 178 and second roll pair 184, 186 are similar to the first die 176 and roll pair 180, 182 except that the rolls are reversed, the second casting roll is on the opposite side of the strip from the first casting roll, the axes of the rolls are in a different plane, and the second die 178 is in a different orientation. In order for the strip 174 to pass in a substantially straight line through the second die nip, the plane through the axes of the rolls 184, 186 is substantially perpendicular to the plane of the strip moving through the die nip and at an angle to vertical. The strip 174 therefore has minimal contact with rolls 184, 186 except for the narrow band of contact produced by the resilient deformation of the resilient material of the outer portion on the back-up roll 186. As stated above, this minimization of contact of the rolls 184, 186 against the polymer on the strip 174 is believed to be helpful in enhancing the quality and performance of the final coated product for some polyester resins. For other polymers such as polypropylene, a substantial roll wrap and cooling of the polymer is preferred before the coated strip departs from the roll.

As with the first set of rolls, the second set of rolls 184, 186 must be pressed against the metal strip 174 and the polymer web with sufficient force to ensure that the polymer web 190 is pressed tightly against the strip across the full width of the roll nip. The force between the second set of rolls 184, 186 should be in a range of approximately 50–300 pli (9.0–53.7 kg/cm), and preferably about 120–180 (21.5–32.2 kg/cm).

After the strip 174 has been coated on both sides or faces with the polymer webs 188, 190, the fully coated strip travels through a post-heater 194 and through a system for cooling the coated strip. Although not essential to the invention, it is believed to be desirable to minimize contact of the coated strip by rolls or other mechanical devices between the coating rolls 184, 186 and when the polymer has been solidified by cooling. For example, it is desirable for the strip 174 to travel in a substantially straight line from rolls 184, 186 through a post-heater 194 and through means, not shown, for at least partially cooling the strip to at least below the melting point of the polymer coatings on the strip. In this way, contact with the polymer on the strip with rolls or the like is avoided before the polymer is solidified, and the coatings are not as likely to be adversely affected by rolls or the like.

The post-heater 194 is preferably an induction heater, infrared heater, convection oven or a combination of two or all three that can quickly heat the resin on the sheet to at least about the softening temperature and preferably above the melting point of the polymers. It is important that such heating not be so high as to significantly deleteriously affect the properties of the metal in the strip or the polymer coatings on the strip. Heating the polymers to at least approximately their melting points may be desirable to cause the polymers to flow and thereby heal any blemishes and/or smooth any unevenness of the coatings on the strip.

After the strip has been post-heated, it is cooled quickly to solidify the coating in a substantially non-crystalline form. It may be desirable to first partially cool the strip with air or other gas to below the melting point of the polymer and then to quench the partially cooled strip with water sprays or a water bath. Partially cooling the strip with air is believed to minimize possible adverse effects that water might have on polymer that is still melted or molten. As used herein, "quickly cooling" means that the polymer coatings are cooled promptly after the coated strip exits the postheater as the strip is traveling at about 300–1500 fpm, and preferably about 600–1200 fpm. The cooling or quench unit is positioned within a few feet, such as about 5–50 feet, of the postheater so the polymer coatings are preferably solidified less than about 10 seconds and more preferably less than about one second after the coated strip exits the postheater.

After the strip has been cooled, it can be further processed as by trimming the edges, slitting, leveling, winding on a coil or made into products such as can ends or can bodies with or without being rewound.

Figure 7:
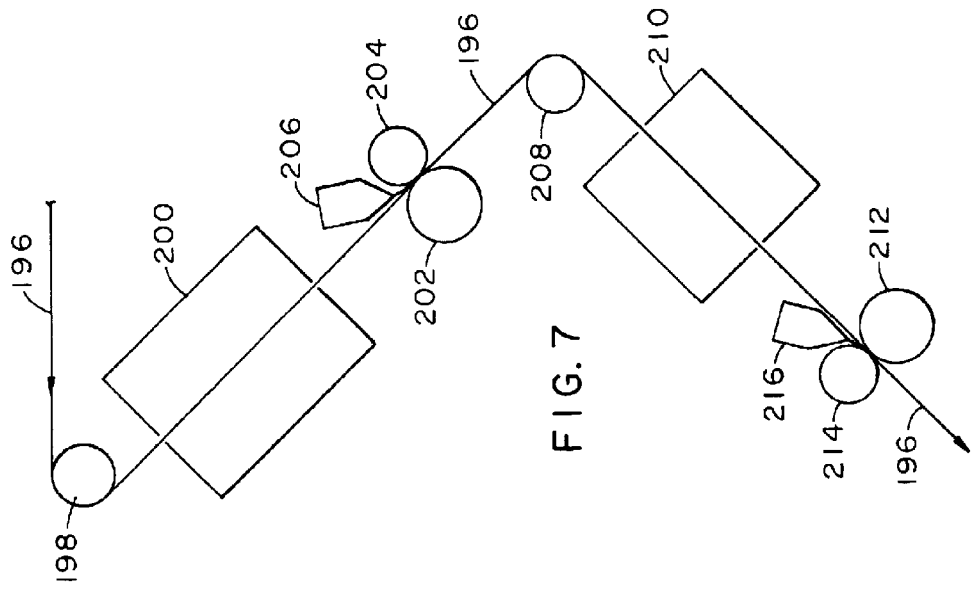

FIG. 7 shows an alternative system similar to the system shown in FIG. 6 except that the upper pair of rolls 202, 204 is positioned with the axes of the rolls disposed in a plane which is perpendicular to the strip 196 passing through the roll nip. Cooling rolls, not shown, may be added to help cool rolls 202, 208 and 212. In this system, there is minimal contact of the strip against the back-up roll so there is less heat transfer from the strip to the back-up roll and less heat damage to the resilient outer portion of the back-up roll 202. This also means less cooling of the strip metal, which may obviate any need to boost or reheat the strip before it is coated on the inverse side. If reheating is desired, the one-sided coated strip has its direction turned by roll 208 and is passed through a boost heater 210. The strip then has its inverse side coated by die 216 and rolls 212, 214. The fully coated strip is then post heated and cooled/quenched in a manner similar to that described above with reference to FIG. 6.

Figure 8:
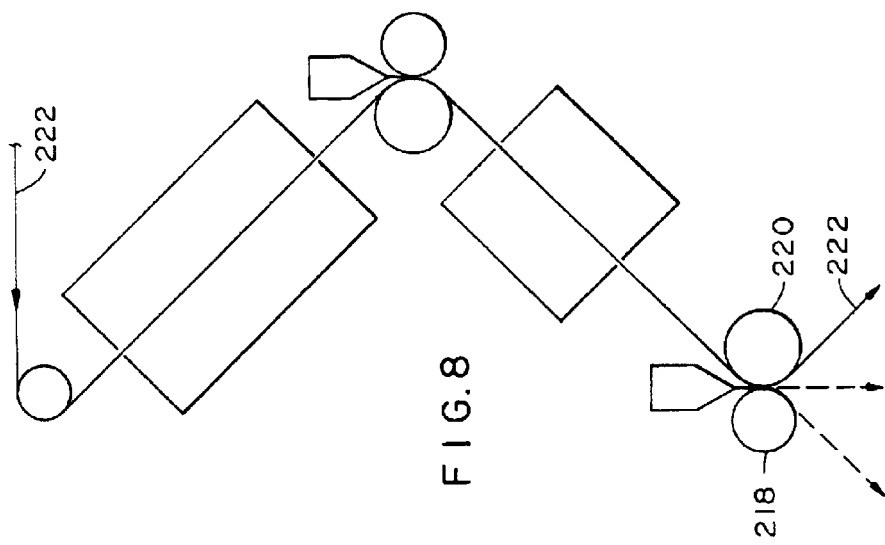

FIG. 8 illustrates an alternative embodiment of this invention which is similar to that of FIG. 6 except that the rolls 218, 220 in the lower coating station are disposed horizontally side by side with their axes in a substantially horizontal plane and with the strip 222 following the back-up roll 210 for about 90° of rotation, whereafter the strip travels to postheat and cooling devices, not shown. FIG. 8 also shows, by dotted lines, several alternative paths for the strip 222 to travel after exiting the roll nip in the lower casting station.

Figure 9:
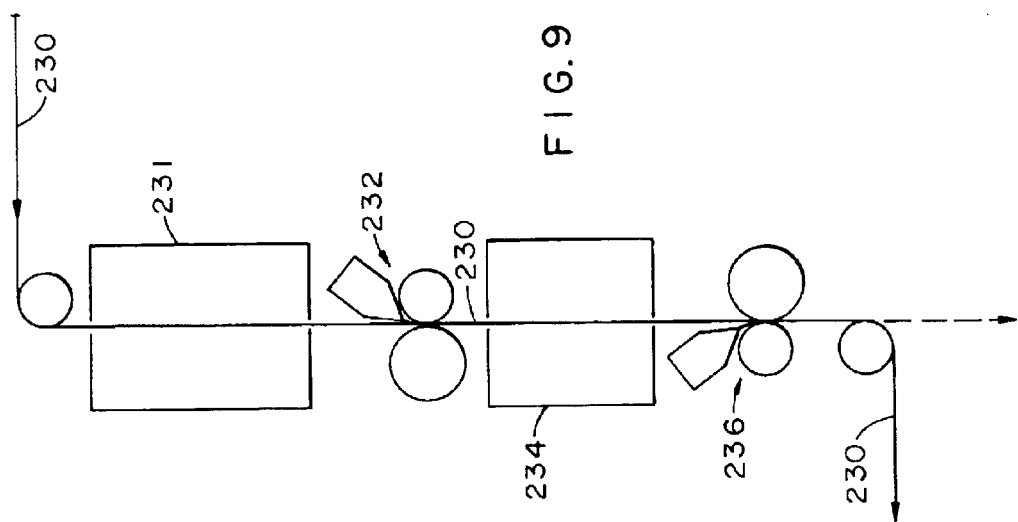

FIG. 9 illustrates another embodiment of this invention with a substantially vertical direction of travel of the strip metal 230 through the preheater 231, a first roll set 232, a boost heater 234 and a second roll set 236. From the second roll set, the doubly coated strip travels through a post-heater, not shown, and a cooling system, not shown. If space permits, the post-heater is preferably located vertically in line below the two coating rolls, and the strip is preferably cooled to below the melting point of the polymer before being contacted by a turning roll. Such cooling to below the melting point of the polymer can be by air cooling whereafter the strip can be turned to pass through a fluid quench such as a water quench.

Figure 10:
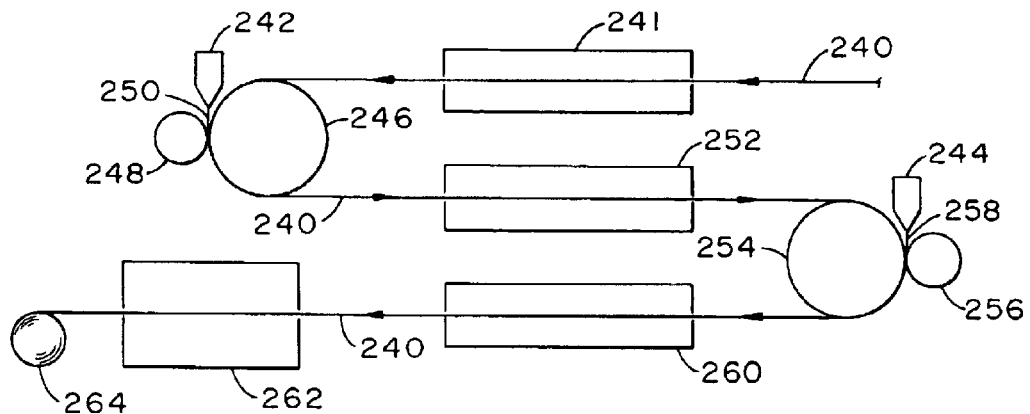

FIG. 10 shows another embodiment of this invention in which metal strip 240 traverses substantially horizontally between two extrusion dies 242, 244 and roll pairs. In this system, the strip 240 is turned around a back-up roll 246 which forms a roll nip with a casting roll 248. The extrusion die 242 extrudes a thin polymer web 250 above the roll nip to be drawn and reduced in thickness before it is pressed against, and adhered to, the strip. Both the casting roll 248 and the back-up roll 246 are cooled as in the previously described systems.

From the back-up roll 246, the strip 240 moves horizontally through an optional boost heater 252 and then around another back-up roll 254 which forms a roll nip with casting roll 256. The extrusion die 244 extrudes a second web 258 of polymer which is drawn to reduce its thickness and is pressed against the strip 240 at the nip between the rolls 254, 256. Both rolls 254, 256 are preferably cooled as in the first roll pair. The doubly coated strip then travels through a post-heater 260 and then a cooler/quench system 262 to produce the final product which can be rewound into a coil 264 or be further processed.

Figure 11:
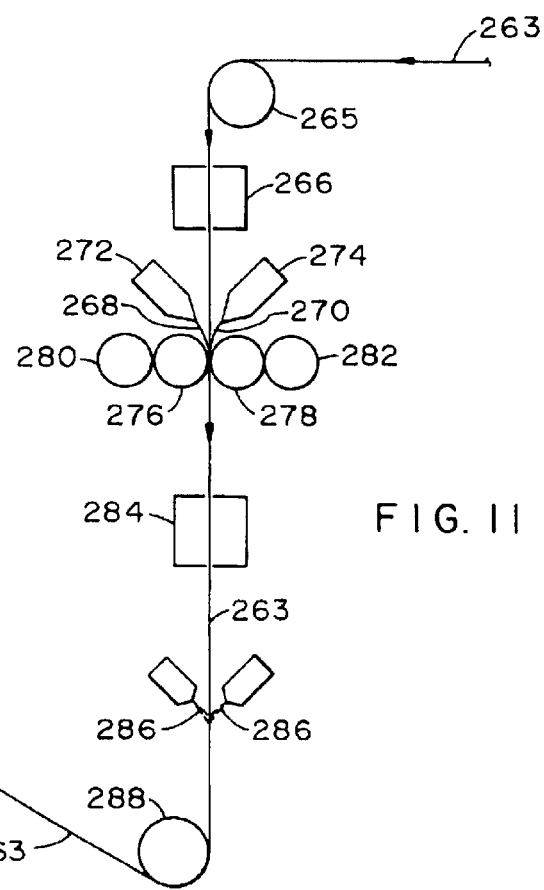

FIG. 11 shows another embodiment for coating metal strip 264 in which the strip travels over a turn roll 265 and through a preheater 266, and in which polymer web 268, 270 are applied substantially simultaneously on opposite sides of the strip. The extrusion dies 272, 274 in this system extrude the polymer webs 268, 270 which are drawn by casting rolls 276, 278 into the roll nip and pressed against opposite sides of the metal strip. At least one, if not both, of the casting rolls 276, 278 preferably has a compressible outer layer such as TEFLON.RTM., VITON.RTM., KEL-F.RTM., elastomer in order to insure continuous bonding force across the entire length of the roll nip. The system preferably includes cooling rolls 280, 282 to help cool the casing rolls 276, 278 and prolong the life of the casting rolls. The system further includes a postheater 284 and quench means such as water sprays 286 similar to those shown in the prior figures.

A further embodiment of the invention is shown in FIG. 12 in which strip material such as an aluminum strip 290 travels over a turn roll 292, through a preheater 294, and between an upper casting roll 300 and upper backup roll 302 to be coated on a first side by a polymer web 298 which is extruded from an upper die 296. The cast roll is preferably a polished steel roll, and the backup roll preferably has a compressible outer layer on it. An upper cooling roll 303 is preferably included to extend the life of the compressible material on the backup roll 302. From the roll nip between rolls 300, 302, the one-side coated strip preferably travels through a heater 304 to reheat or boost the temperature of the strip for coating of the inverse side by a second polymer web 312 which is extruded by lower extrusion die 310. A lower casting roll 308 and backup roll 306 press the web 312 against the strip to adhere it to the strip. Lower casting roll 308 is preferably polished steel, and the lower backup roll 306 has a compressible outer surface such as TEFLON.RTM., VITON.RTM., KEL-F.RTM., elastomer. A lower cooling roll 314 may optionally be included as with the upper roll set. After application of the second polymer web, the two-side coated strip is preferably postheated to above the melting point(s) of the polymer(s) by a heater 316 and then quickly cooled as with water sprays 318.

A still further embodiment of this invention is shown in FIG. 13 in which metal strip material 320 is sequentially coated on opposite sides as the strip travels in a generally "S" path through the system. In this system, the metal strip 320 travels over a turn roll 322, through a preheater 324 and between a casting roll 330 and backup roll 332 for a first polymer web 326 from die 328 to be adhered to one side of the strip. A cooling roll 348 is preferably included to extend the life of compressible material on the backup roll. In this system, the location of the casting roll 330 and backup roll 332 is such that the strip metal 320 wraps part way around the rolls for about 45–90° of rotation of the rolls depending on the direction of travel of the strip with respect to a plane through the axes of the two rolls.

After receiving the first coating, the metal strip 320 is preferably turned in direction by a turn roll 336 and travels through a heater 338 to boost the temperature of the strip, followed by application of a coating to the opposite surface of the strip by casting roll 344, backup roll 346, cooling roll 348 and extrusion die 340 which extrudes polymer web 342 into the roll nip. The location of the rolls 344, 346 with respect to the direction of travel of the strip 320 is similar to the upper coating station so the strip also wraps part of the way around the rolls as the strip moves through the lower coating station. From the lower coating station, the strip 320 with coating on both sides is preferably postheated to above the melting point of the polymer or polymers and then quickly cooled to solidify the polymers on the strip.

FIG. 14 shows a further embodiment of the invention which is particularly suited for applying polypropylene coatings on both sides of an aluminum strip material. In this system, strip metal 352 travels over a turn roll 354, downwardly at about 30–60° to vertical through a preheater 356 and into the roll nip between a backup roll 358 and a cast/chill roll 360 for a polymer web 364 from die 362 to be applied to the strip. In this system, the strip metal 352 wraps part way around the cast/chill roll 360 for the roll to cool the polymer on the strip to insure that the polymer, and especially a polypropylene material, will peel off the roll and remain on the metal strip. A take-off roll 370 may be employed to cause the strip 352 to follow the cast/chill roll 360 as shown. The cast/chill roll preferably internally cooled and has a relatively large diameter such as about 3–6 feet (0.91–1.83 meters) in diameter to sufficiently cool the strip and polymer on it. The backup roll preferably has a compressible outer layer on it and is preferably internally and/or externally cooled.

From the upper coating station, the strip 352 travels over a turn roll 372, through a heater 374 to have a second coating applied on it by a lower coating station which is essentially the same as the upper coating station. The lower coating station includes an extrusion die 382, a backup roll 376, a cast/chill roll 378, and a take-off roll 384 for applying a polymer web such as a polypropylene to the metal strip. The doubly coated strip from the take-off roll 384 is then preferably postheated and quickly cooled as with the other systems described herein.

For some applications or this invention, the coatings maybe different polymers on opposite sides of the metal strip and may have different thicknesses. For example, the coating on one surface may be a blend of a high melt viscosity polyester and a bottle grade polyester and the coating on the other surface can be a polyethylene or vinyl resin. The coating on one or both surfaces may also include a pigment or coloring material in it.

Coating strip metal in accordance with this invention for use in packaging applications such as use in making can bodies or can ends requires the coatings to be tightly adhered to the metal strip. Use of the strip for packing applications also requires that the surfaces of the coatings be smooth and glossy. The surfaces should have a minimum of irregularities in them such as embossing or surface blemishes. The mechanical properties of the metal, such as tensile strength, yield strength, elongation, formability, and corrosion resistance are also desirably maximized. The coatings must also be flexible so they won't crack or delaminate when the strip is processed into the final product such as a can body, can end or other products. The coatings for packaging applications are also quite thin such as about half a mil in thickness and should be substantially uniform in thickness.

In the practice of this invention, the path of the metal strip through the roll pairs, the post-heat apparatus and cooling/quench system plays an important role in the quality of the coated strip. In particular, it is desirable to minimize contact of the coatings on the strip with the rolls before the coatings are cooled to at least below the melting point, and possibly the softening point of the polymers in the coatings. For some systems, it is desirable to air cool the coated strip, after the post-heat, down to below the melting point of the polymers before the water quench. This air cooling minimizes possible adverse effects on the molten coating by water in the quench.

Aluminum strip which has been coated in accordance with this invention has many advantages over strip that has been coated or laminated in accordance with prior art methods. One important advantage is that the coating is tightly adhered or bonded to both sides of the metal substrate and does not peel or delaminate when the strip is formed into products such as drawn or drawn and ironed can bodies, can ends, or decorative trim for automobiles or appliances. The strip can also be produced at less cost than prior art strip because this invention eliminates secondary processes of forming, rolling and unrolling of films that are laminated to the strip by prior art techniques.

It is therefore seen that this invention provides an improved continuous process for coating both sides of a metal strip with thermoplastic coatings and to an improved strip which has been so formed. While some alternative modes for practicing the invention have been described, it will be apparent that the appended claims are intended to cover all modes and embodiments which fall within the spirit of the invention. For example, the coating or coatings on the metal strip can be polished while the coating is near or above its melting point by means of a polished kiss roll over which the coated strip is passed after postheating and before the coatings are cooled. Other alternative processing will be apparent in view of the description contained herein.

Having described the presently preferred embodiments, it is to be understood that the invention may be otherwise embodied within the scope of the appended claims.

What is claimed is:

1. An apparatus for coating both sides of a metal strip with polymer, comprising:

a preheater for heating an uncoated metal strip;

first and second pairs of rolls located downstream of the preheater, with each pair of rolls including a casting roll and a backup roll, and with the casting roll and backup roll for each pair of rolls forming a nip for moving the metal strip therethrough;

first and second extrusion dies located above, respectively, the first and second pairs of rolls, with the extrusion dies disposed to extrude molten polymer webs onto opposite sides of the metal strip substantially at the roll nips or just ahead of the roll nips, and with the roll nips configured to press the polymer webs to the opposite sides of the metal strip to adhere the polymer webs to the metal strip;

a reheater located between the first and second pairs of rolls for reheating the metal strip and polymer web deposited thereon as the metal strip passes between the first and second pairs of rolls;

a postheater located downstream of the first and second pairs of rolls for heating the coated metal strip and enhancing the bonding between the polymer webs and the opposite sides of the metal strip; and a quenching device located downstream of the postheater for quickly cooling the coated metal strip after the coated metal strip moves through the postheater.

2. The apparatus of claim 1 wherein the extrusion dies are disposed to extrude the molten polymer webs onto the opposite sides of the metal strip up to about 25° of rotation of the casting roll ahead of the roll nips.

3. The apparatus of claim 1 further including flame heaters located upstream of the first pair of rolls for flame treating the opposite sides of the metal strip to enhance bonding of the polymer webs to the opposite sides of the metal strip.

4. The apparatus of claim 1 wherein the quenching device uses one of cooling water and cooling air as the quenching medium.

5. The apparatus of claim 1 wherein the quenching device is a water bath, and wherein the apparatus further includes a drying device located downstream of the water bath for drying the coated metal strip as it exits the water bath.

6. The apparatus of claim 1 wherein the extrusion dies are positioned approximately 4 to 12 inches above the first and second pairs of rolls.

7. The apparatus of claim 1 wherein the extrusion dies each define a die opening slot for extruding the polymer webs onto the opposite sides of the metal strip, and wherein the die opening slot for each extrusion die has an opening width of between approximately 0.005 to 0.030 inch.

8. The apparatus of claim 1 wherein at least one of the casting rolls for each pair of rolls is a hard metal roll having a chrome metal roll surface.

9. The apparatus of claim 1 wherein at least one of the casting rolls for each pair of rolls is a hard metal roll having a roll surface made of a material selected from the group consisting of chrome plating, chrome oxide, and aluminum oxide.

10. The apparatus of claim 1 wherein at least one of the backup rolls for each pair of rolls has a resilient roll surface made of high temperature resistant elastomer.

11. The apparatus of claim 1 wherein at least one of the backup roll and casting roll for each pair or rolls has a resilient roll surface made of high temperature resistant elastomer.

12. The apparatus of claim 1 wherein at least one of the backup rolls for each pair of rolls has a resilient roll surface made of a material selected from the group consisting of silicone rubber, polyurethane, chlorotrifluoroethylene polymers, and tetrafluoroethylene fluorocarbon polymers.

13. The apparatus of claim 12 wherein the material comprising the resilient roll surface has a Durometer hardness of about 75–85 shore A.

14. The apparatus of claim 1 wherein the at least one of the backup rolls for each pair of rolls is comprised of one of natural and synthetic rubber and has a roll surface made of a material selected from the group consisting of silicone rubber, polyurethane, chlorotrifluorethylene polymers, and tetrafluoroethylene fluorocarbon polymers.

15. The apparatus of claim 1 wherein at least one of the casting rolls for each pair of rolls has a resilient roll surface made of a material selected from the group consisting of silicone rubber, polyurethane, chlorotrifluorethylene polymers, and tetrafluoroethylene fluorocarbon polymers.

16. The apparatus of claim 1 where the casting roll and backup roll for each pair of rolls have smooth roll surfaces in a range of about 2–20 root-mean-square.

17. The apparatus of claim 1 further including a cooling support roll in contact with the backup roll for each pair of rolls.

18. The apparatus of claim 1 wherein the first pair of rolls is disposed higher than the second pair of rolls such that the metal strip travels downward from the first pair of rolls to the second pair of rolls.

19. The apparatus of claim 18 wherein the second pair of rolls is horizontally offset from the first pair of rolls such that the metal strip travels downward from the first pair of rolls to the second pair of rolls and at angle to vertical.

20. The apparatus of claim 18 wherein the second pair of rolls is horizontally offset from the first pair of rolls, and further including a turn roll located between the first and second pairs of rolls for changing the direction of the metal strip as it travels downward from the first pair of rolls to the second pair of rolls.

21. The apparatus of claim 18 wherein the second pair of rolls is aligned along a substantially vertical axis with the first pair of rolls such that the metal strip travels substantially vertically downward from the first pair of rolls to the second pair of rolls.

22. The apparatus of claim 18 wherein the second pair of rolls is horizontally offset from the first pair of rolls such that the metal strip travels from the first pair of rolls to the second pair of rolls in a substantially horizontal plane.

23. The apparatus of claim 1 wherein each pair of rolls is configured to exert a roll nip compression force of between about 50 to 300 pounds per linear inch on the metal strip.

24. The apparatus of claim 1 wherein the casting rolls and backup rolls for the first and second pair of rolls are operable to rotate at a higher surface velocity than the velocity of the molten polymer webs exiting the extrusion dies, thereby drawing the polymer webs applied to the metal strip to a reduced thickness.

25. The apparatus of claim 24 wherein a ratio of the surface velocity of the casting rolls and backup rolls to the velocity of the molten polymer webs exiting the extrusion dies is between about 5:1 to 200:1.

26. The apparatus of claim 1 wherein the casting roll and backup roll for each pair of rolls have centers offset vertically from each other.

27. The apparatus of claim 1 wherein the casting roll and backup roll for at least one of the pairs of rolls have centers offset vertically from each other.

28. The apparatus of claim 2 wherein the casting roll and backup roll for each pair of rolls have centers offset vertically from each other.

29. The apparatus of claim 2 wherein the casting roll and backup roll for at least one of the pairs of rolls have centers offset vertically from each other.

30. The apparatus of claim 1 wherein casting roll for each pair of rolls is internally cooled.

31. The apparatus of claim 1 further including a takeoff roll located on an opposite side of the casting roll from the backup roll for each pair of rolls, the takeoff roll forming a second roll nip with the casting roll for each pair of rolls, and the metal strip passing through the second roll nip for each pair of rolls such that the metal strip wraps around a portion of the roll surfaces of each of the casting rolls.

32. An apparatus for coating both sides of a metal strip with polymer, comprising:
 a preheater for heating an uncoated metal strip;
 a pair of casting rolls located downstream of the preheater, with the casting rolls forming a nip for moving the metal strip therethrough, and with the casting rolls each having a resilient roll surface for contacting the metal strip;
 first and second extrusion dies located above, respectively, the casting rolls, with the extrusion dies disposed to extrude molten polymer webs onto opposite sides of the metal strip substantially at the roll nip formed by the casting rolls or just ahead of the roll nip, and with the roll nip configured to press the polymer webs to the opposite sides of the metal strip to adhere the polymer webs to the metal strip;
 a postheater located downstream of the casting rolls for heating the metal strip and enhancing the bonding between the polymer webs and the opposite sides of the metal strip; and
 a quenching device located downstream of the postheater for quickly cooling the coated metal strip after the coated metal strip moves through the postheater.

33. The apparatus of claim 32 further including a pair of cooling support rolls located adjacent and in contact with, respectively, the casting rolls.

34. The apparatus of claim 32 wherein the casting rolls are operable to rotate at a substantially higher surface velocity than the velocity of the molten polymer webs exiting the extrusion dies, thereby drawing the polymer webs applied to the metal strip to a reduced thickness.

35. The apparatus of claim 34 wherein a ratio of the surface velocity of the casting rolls to the velocity of the molten polymer webs exiting the extrusion dies is between about 5:1 to 200:1.

36. The apparatus of claim 32 wherein the casting rolls each have a resilient roll surface made of a material selected from the group consisting of silicone rubber, polyurethane, chlorotrifluoroethylene polymers, and tetrafluoroethylene fluorocarbon polymers.

37. The apparatus of claim 32 wherein the roll nip formed by the casting rolls is aligned along a substantially vertical axis such that the metal strip travels substantially vertically through the roll nip.

38. The apparatus of claim 32 wherein the quenching device uses one of cooling water and cooling air as the quenching medium.

39. The apparatus of claim 32 wherein the casting rolls each have a resilient roll surface made of high temperature resistant elastomer.

40. The apparatus of claim 32 wherein the extrusion dies each define a die opening slot for extruding the polymer webs onto the opposite sides of the metal strip, and wherein the die opening slot for each extrusion die has an opening width of between approximately 0.005 to 0.030 inch.

41. An apparatus for coating both sides of a metal strip with polymer, comprising:

a preheater for heating an uncoated metal strip;

a pair of applicator rolls located downstream of the preheater, with the applicator rolls forming a roll nip for moving the metal strip therethrough;

a pair of pinning and drawing rolls located adjacent, respectively, the applicator rolls;

first and second extrusion dies located above, respectively, the pinning and drawing rolls, with the extrusion dies disposed to extrude molten polymer webs onto the roll surfaces of the pinning and drawing rolls, with the pinning and drawing rolls operable to rotate at a higher surface velocity than the velocity of the molten polymer webs exiting the extrusion dies, thereby drawing the polymer webs to a reduced thickness prior to passing the polymer webs to the applicator rolls, and with the roll nip formed by the applicator rolls configured to press the polymer webs to opposite sides of the metal strip to adhere the polymer webs to the metal strip;

a postheater located downstream of the applicator rolls for heating the metal strip and enhancing the bonding between the polymer webs and the opposite sides of the metal strip; and a quenching device located downstream of the postheater for quickly cooling the coated metal strip after the coated metal strip moves through the postheater.

42. The apparatus of claim 41 further including a pair of cooling and polishing rolls located between and separating, respectively, the applicator rolls and the pinning and drawing rolls, with the cooling and polishing rolls configured to cool and polish the polymer webs by rolling contact between the cooling and polishing rolls and the polymer webs prior to their application by the applicator rolls to the metal strip.

43. The apparatus of claim 41 further including a cooling and turning roll located between the applicator rolls and the postheater for cooling the coated metal strip and changing its direction of travel after exiting the applicator rolls.

44. The apparatus of claim 43 wherein the cooling and turning roll includes an inner shell and an outer shell spaced from the inner shell, with the inner and outer shells defining an annular chamber therebetween at least partially filled with a cooling liquid for cooling the metal strip as it passes over the cooling and turning roll.

45. The apparatus of claim 44 wherein the quenching device is a second cooling and turning roll.

46. The apparatus of claim 41 further including flame heaters located upstream of the applicator rolls for flame treating the opposite sides of the metal strip to enhance bonding of the polymer webs to the opposite sides of the metal strip.

47. The apparatus of claim 41 wherein the quenching device is a water bath, and wherein the apparatus further includes a drying device located downstream of the water bath for drying the coated metal strip as it exits the water bath.

48. The apparatus of claim 41 wherein a ratio of the surface velocity of the pinning and drawing rolls to the velocity of the molten polymer webs exiting the extrusion dies is between about 5:1 to 200:1.

49. The apparatus of claim 41 wherein the roll nip formed by the applicator rolls is aligned along a substantially vertical axis such that the metal strip travels substantially vertically through the roll nip.

50. The apparatus of claim 41 wherein at least one of the applicator rolls has a resilient roll surface made of high temperature resistant elastomer.

51. The apparatus of claim 41 wherein at least one of the applicator rolls has a resilient roll surface made of a material selected from the group consisting of silicone rubber, polyurethane, chlorotrifluorethylene polymers, and tetrafluoroethylene fluorocarbon polymers.

* * * * *